United States Patent [19]

Uriarte

[11] Patent Number: 5,143,386

[45] Date of Patent: Sep. 1, 1992

[54] AUTOMATIC LEVELING SYSTEM

[76] Inventor: Jorge Uriarte, 13 Cornwallis, Irvine, Calif. 92714

[21] Appl. No.: 618,940

[22] Filed: Nov. 28, 1990

[51] Int. Cl.[5] .......................... B60S 9/00; B62D 37/00
[52] U.S. Cl. ..................................... 280/6.1; 280/6.12; 280/707; 280/DIG. 1; 180/41
[58] Field of Search ....................... 280/840, 6.1, 6.12, 280/707, DIG. 1; 180/41

[56] References Cited

U.S. PATENT DOCUMENTS

| 4,084,830 | 4/1978 | Daniel, Jr. et al. | 280/6.1 |
| 4,572,527 | 2/1986 | Stafford-Mills et al. | 280/6.1 |
| 4,679,489 | 7/1987 | Jasinski et al. | 280/6.1 |
| 4,746,133 | 5/1988 | Hanser et al. | 280/6.1 |
| 4,784,400 | 11/1988 | Hoflys | 280/6.1 |

Primary Examiner—Kenneth R. Rice
Attorney, Agent, or Firm—Alfred E. Miller

[57] ABSTRACT

A system for automatically leveling a vehicle, such as a recreational vehicle installed with a plurality of extensible jacks and disposed at strategic positions on the vehicle underside, and responsive to an automatic level control electronics to extend simultaneously all of the jacks and at different speeds as determined by the angle of vehicle versus gravity and bring vehicle to a level condition. The jacks are stopped when they are use higher current than that used before the jacks contact the ground, to assure ground contact, and the vehicle is level.

22 Claims, 12 Drawing Sheets

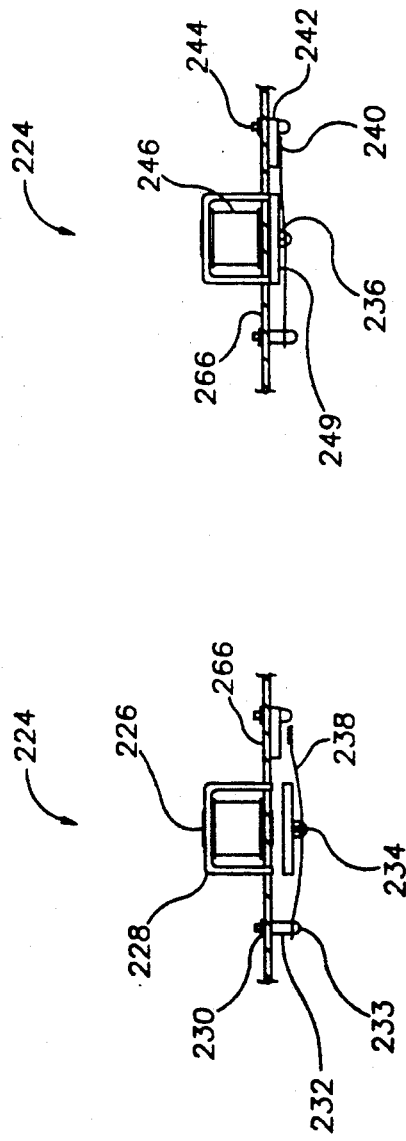

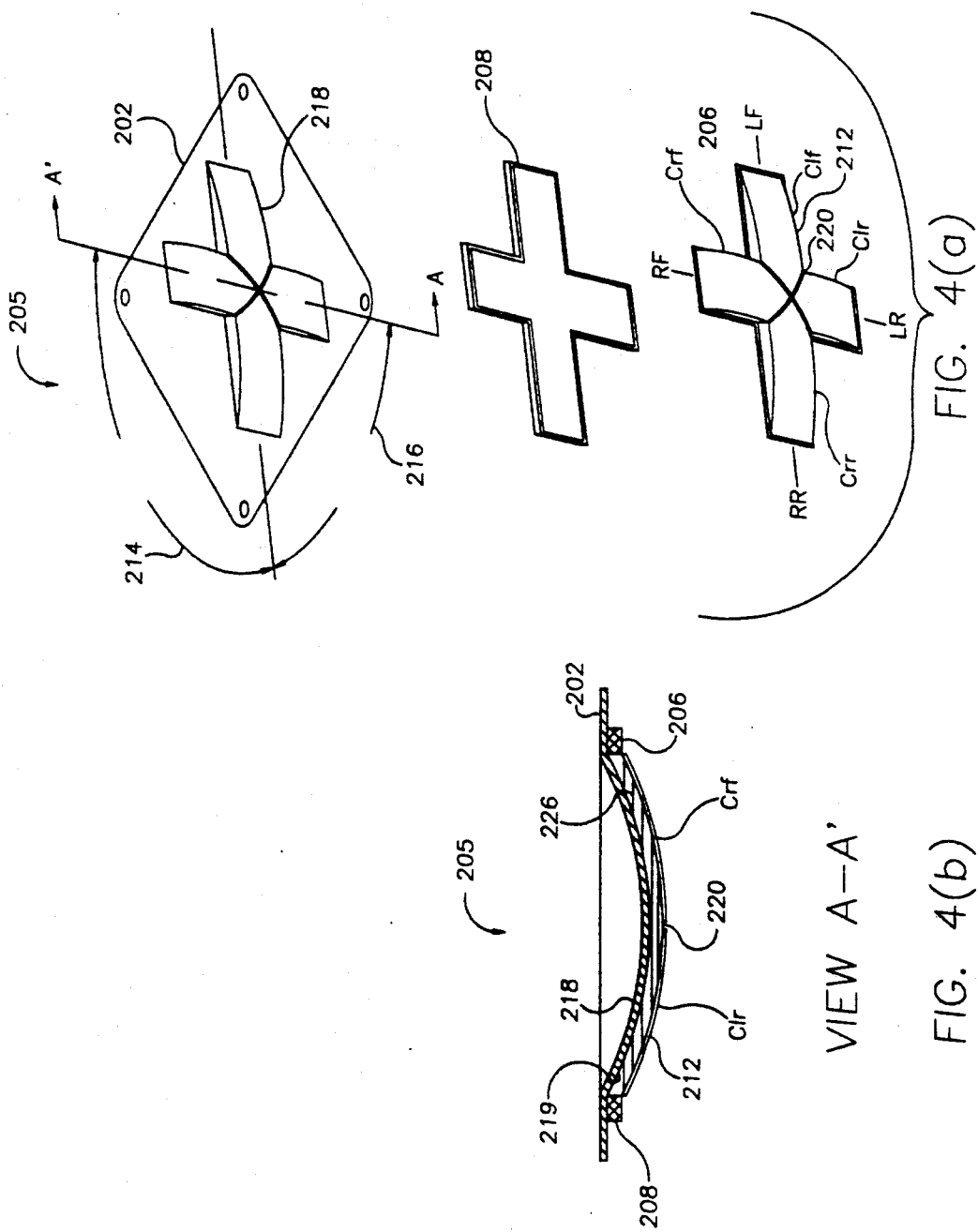

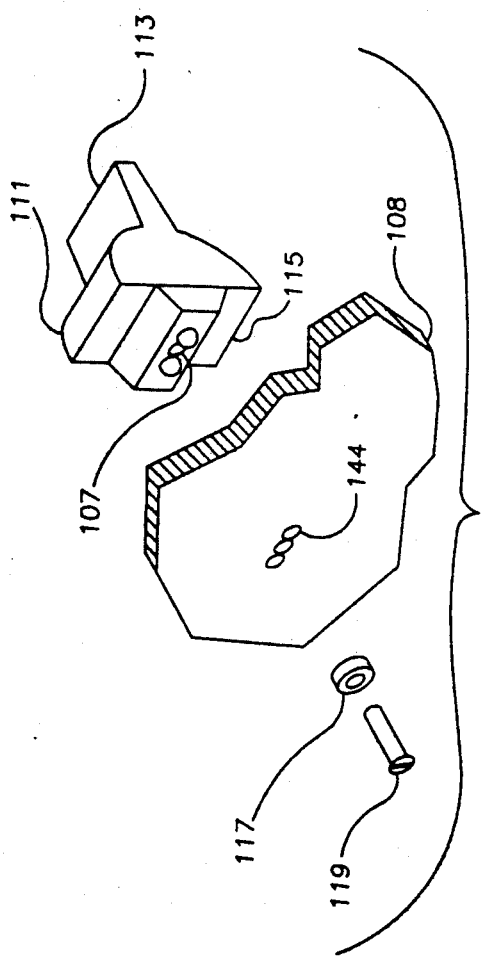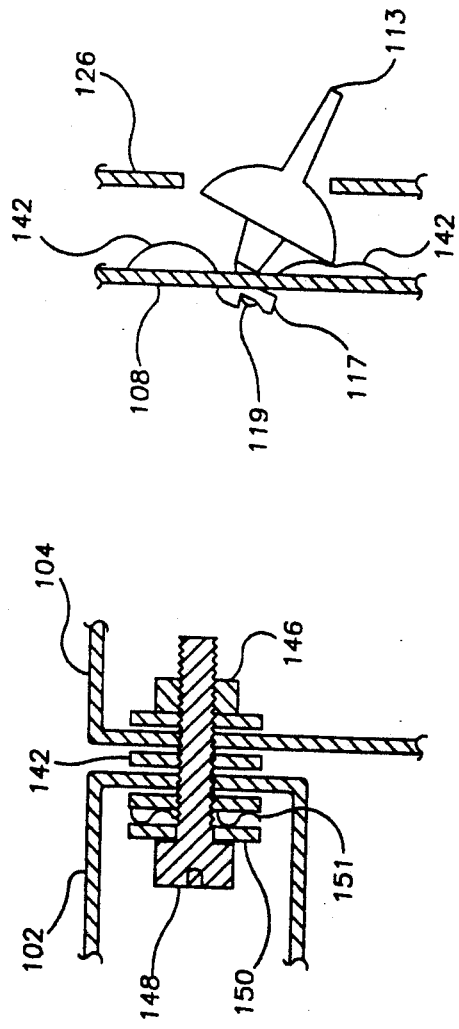

AUTOMATIC LEVELING SYSTEM

FIELD OF THE INVENTION

This invention relates to a control system for the support of vehicles, and more particularly to a control system for leveling and supporting trailers, campers, motor homes, trucks and other vehicles in a level position while parked on a uneven or sloping terrain.

BACKGROUND OF THE INVENTION

Several system are available for the leveling of vehicles. In both hydraulic to electrical systems, most of the known arrangements require power to be distributed to only one jack at a time, so that such systems are essentially slow to operate.

Some of these systems are provided with an elaborate arrangement of control elements, making them difficult to install and expensive to service.

SUMMARY OF THE INVENTION

In view of the above, it is the principal object of this invention to provide a simplified yet improved leveling control system for vehicles.

It is another object of this invention to provide an improved and simplified leveling control system for use in vehicle leveling and support.

Yet a further object of this invention is to provide an improved and simplified leveling control system including compact modular design devices with a minimum of connections and including plug-in type modular connectors so that the control system can be easily installed and serviced.

A still further object of this invention is to provide an improved and simplified leveling control system that can control all of the jacks at the same time and at different speeds whenever required to accomplish the leveling function in a minimum of time.

More specifically, this invention contemplates the provision of a system useful in controlling the leveling and supporting a parked vehicle. The system includes a plurality of extensible jacks, preferable electric, secured at spaced location under the vehicle, a main control preferably mounted on the bottom of vehicle and towards the center thereof and means for simultaneously and independently controlling each jack and including means to determine the proportional tilt of vehicle relative to gravity. The proportional tilt readings are used to determined the extension speed of each jack which are controlled by varying the motor turn on duty cycle of each jack. The turn on duty cycle is repeated at a specific frequency. The jacks are extended with a maximum speed on the jacks(s) which are under the lowest corner(s) of the vehicle and with a lesser speed on the jack(s) which are under the highest corner(s) of the vehicle. The differences in speeds are proportional to the degree of tilt of vehicle relative to gravity. Thus, the greater the tilt readings, the slower the extension speed of the jacks(s) under the highest corner or side of vehicle. Similarly, with a minimum tilt reading, all the jacks are extended at the maximum speed. The jacks are brought to a stop when each jack is lifting a minimum load and the vehicle has reached a level position. The main control, which is mounted adjacent the bottom of the vehicle, as described, includes means to communicate with the terminal control which is mounted preferably inside the vehicle and near the driver's seat. The terminal control has means to interface between the operator and the main control.

BRIEF DESCRIPTION OF THE DRAWING

In order that the invention may be more clearly understood, it will now be disclosed in greater detail with reference to the accompanying drawing, wherein:

FIGS. 3(c) and (d) are cross sectional views of a relay assembly in activated and deactivated states, respectively;

FIGS. 4(a) and (b) are perspective exploded and cross section views, respectively, of the proportional level sensor depicted in FIGS. 3(a) and (b);

FIGS. 5(c) and (d) illustrate a disassembled, and assembled and activated switch, respectively;

FIG. 5(e) is a cross sectional view of one of the pivotal hinges of the rotatable assembly on the terminal control;

DETAILED DISCLOSURE OF THE INVENTION

Figure 1:
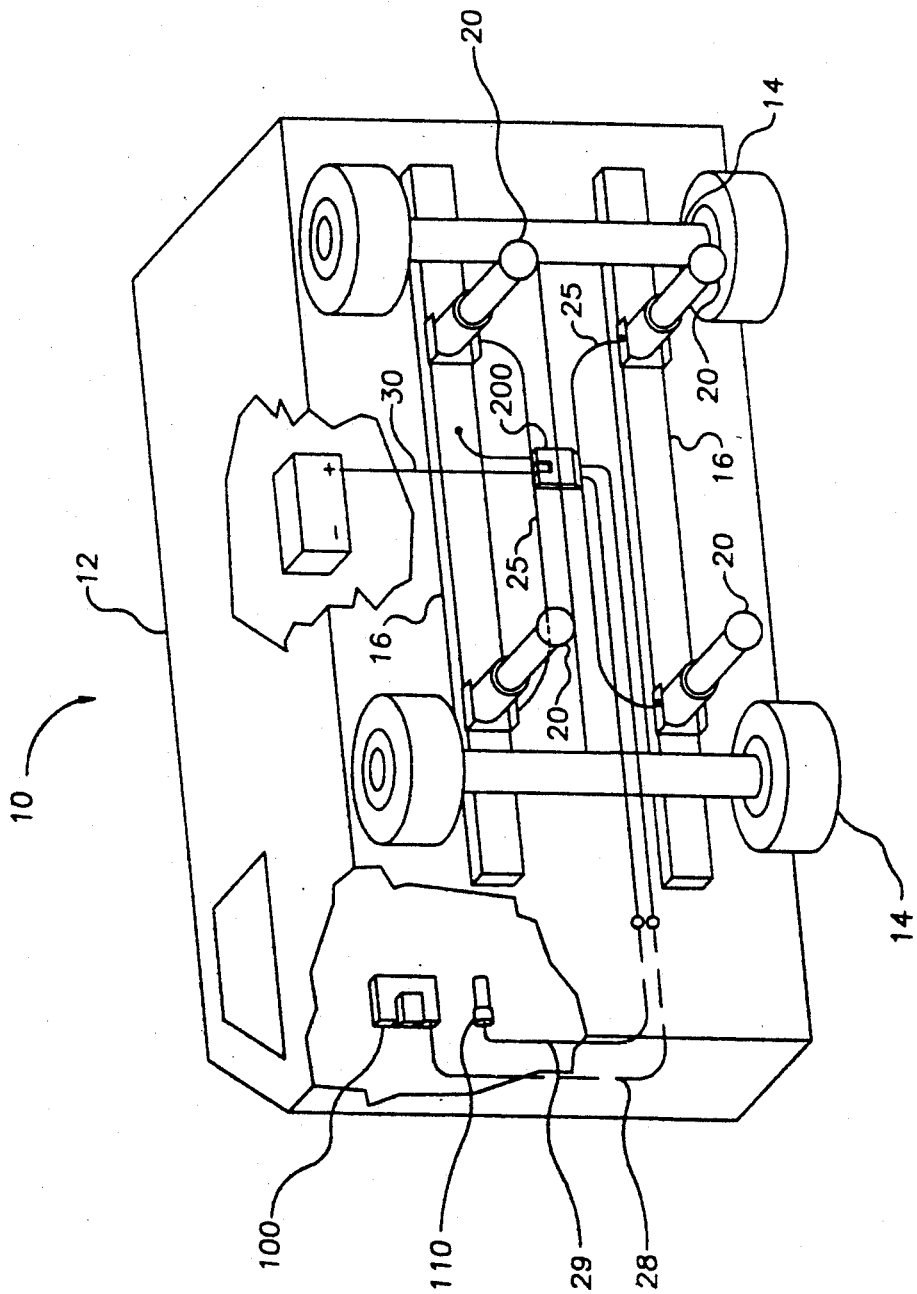
FIG. 1 is a bottom perspective view of a motor home with portions cut away to better show the motor home installed with the leveling control system according to the present invention and controlling a plurality of jacks shown in a lower operating position.

Referring now to FIG. 1 a motor home 10 has an enclosed body portion 12 supported by two sets of wheel-axle assemblies 14. It will be apparent that the invention is not limited for use with the type of vehicle illustrated in FIG. 1, and may alternatively be employed in combination with various other types of vehicles, such as campers, trailers, trucks and the like. Thus, the specific motor home illustrated is only shown for the purpose of convenience in explaining the invention, and is not to be taken as limiting the invention.

Mounted on the bottom surface of frame 16 of vehicle 10 are a plurality of preferably electrically operated jacks 20. Preferably four such devices are used with a vehicle of the type illustrated, one adjacent to each corner. A main control unit 200 is mounted preferably on the bottom of the vehicle 10, near the center thereof. A terminal control 100 is preferably mounted inside vehicle 10 and next to the vehicle's operator seat.

Figure 2A:
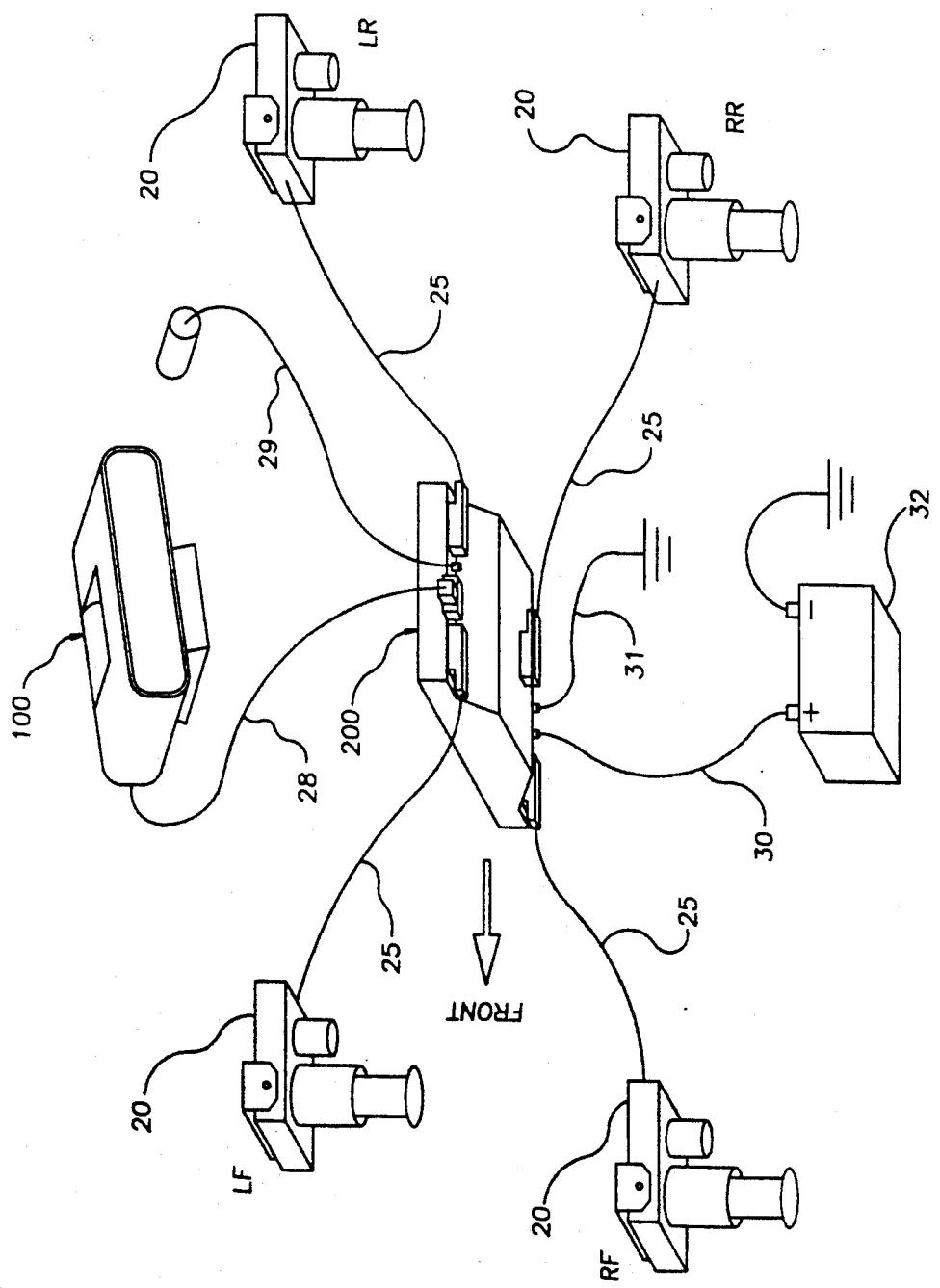
FIG. 2(a) is a simplified perspective wiring diagram of a system according to the present invention.
Figure 2B:
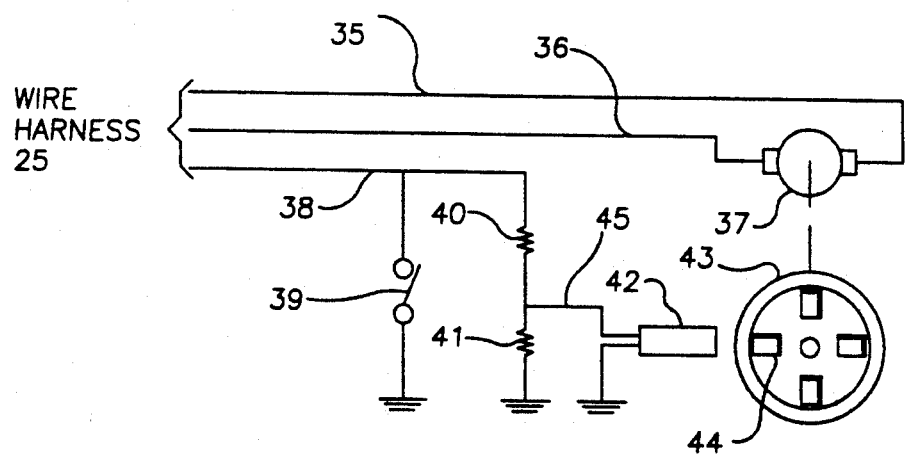
FIG. 2(b) is an electrical schematic of an electrically operated jack.

A detailed disclosure of the construction of the jacks 20 will not be provided herein since suitable jacks are well known. An electrical circuit that may be provided in each jack is illustrated in FIG. 2(b), wherein wires 35 and 36 connect directly to the jack motor 37. Wire 38, which will be referred to herein as the jack status line, is connected to a switch 39 and a resistor network 40 and 1. A magnetically activated switch such as reed switch 42 is connected between the junction of resistors 40,41 and ground. Magnet(s) 44 supported on, for example a gear 43 on the jack gear train (not shown) will magnetically and alternatively activate reed switch 42 as the gear 43 rotates. This results in the production of voltage pulses on the jack status line 38. The pulses on line 38 are not grounded unless the jack is fully retracted. When the jack is fully retracted, it activates switch 39 and grounds the voltage on the jack status line 38. As can be appreciated, the jack status line 38 serves the double function of indicating when the jacks are fully retracted, or providing a train of pulses proportional to the speed and extension of the jack when it is activated.

Figure 3A:
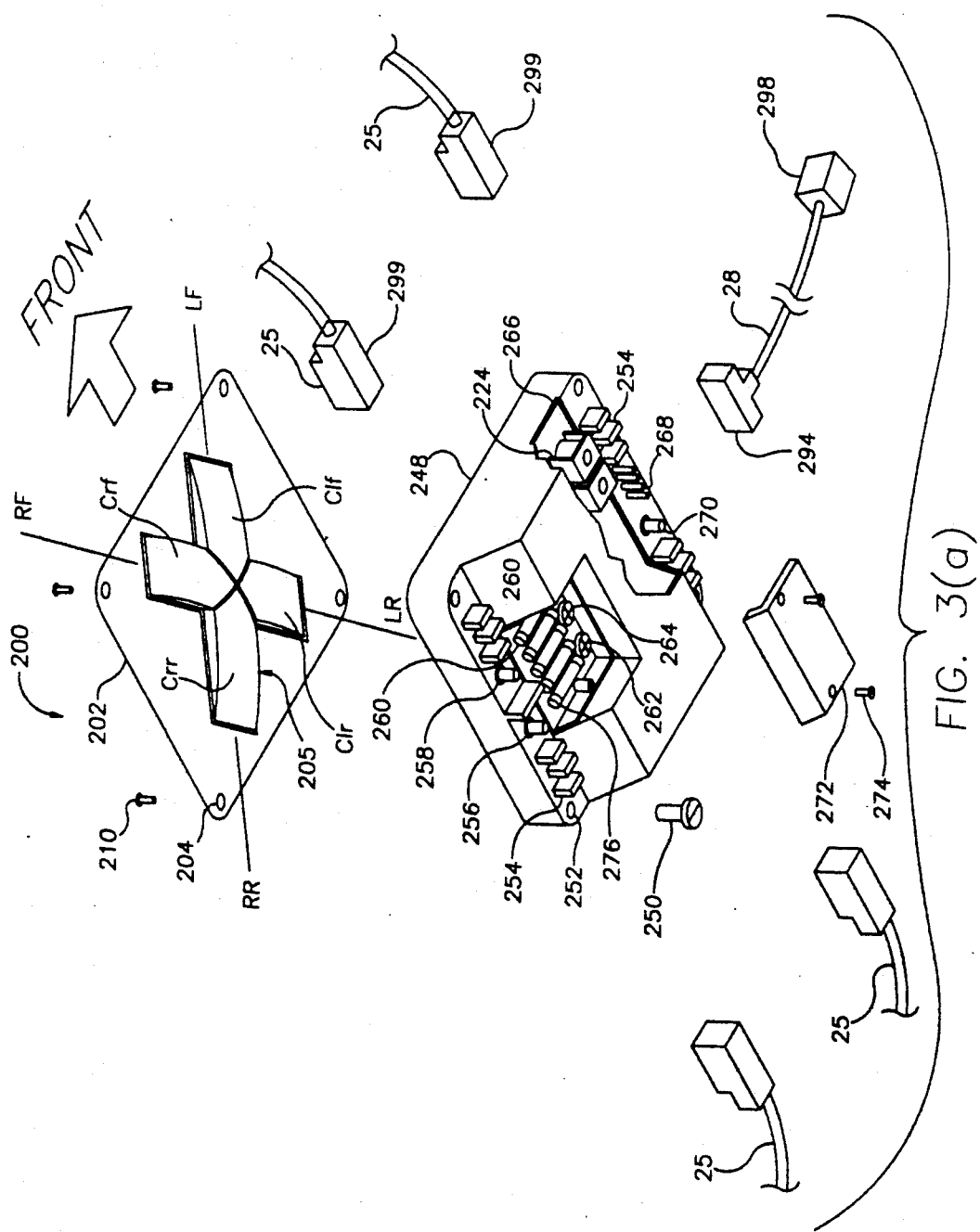
FIG. 3(a) is an exploded bottom view in perspective of the main control with portions cut away to better illustrate certain details, and including modular plug-in connectors.

Referring to FIG. 3(a), the main control 200, as will be obvious, must be orientated in a specific direction with respect to the vehicle 10, parallel to the sides of vehicle 10, and preferably affixed on the underside of the vehicle near the center there, for example with bolts 250 extending through mounting holes 252.

The main control 200 is comprised of a cover 248 which encapsulates a printed circuit board 226, and lid 202. A lid 272 is removably affixed to the bottom of the cover 248 by screws 274 to expose an array of fuses 260, 276, and to enable the adjustment of variable resistors 262 and 264. Distributed around the perimeter of cover 248 are a plurality of connections including a set of male connectors 254 for each jack. Preferably four of such connections are provided. A plug-in connector 268 is provided for a connection to the terminal control 100 via a wire harness 28 which includes a modular plug-in receptacle 294 with one of its contacts offset in order to avoid plug-in errors during installation or servicing.

The connectors 254 are orientated toward the respective jacks to which they are connected so that it will be simple to determine which connector 254 goes to which jack 20 during installation or servicing. A separate wire harness 25 is connected from the main control 200 to the respective jack 20 and includes a modular plug in connector 299 with one of the contact sockets offset to match the mating connector 254 in only one way, thus avoiding potential plug-in errors during installation or servicing.

Still referring to FIG. 3(a), the lid 202 is made of electrical conductive material, preferably aluminum, and is supported on the cover 248 by screws 210 that extend through holes 204. With reference to FIG. 4(a,b), the lid 202 forms part of a proportional level sensor 205. Lid 202 has a downwardly extending cavity 218 formed therein. The cavity is "X" shaped, from a top view, and the bottom walls of the cavity are curved. A matching similarly shaped cover 206, preferably of a plastic material, is mounted to the cover 202, via a spacer and seal 208, to define an internal cavity 219. The outer "X" shaped curved surfaces of cover 206 are covered with an electrically conductive material 212 that is electrically separated into four sections 220. Each of the areas of conductive material covers a separate arm of the respective "X", with the separating lines between the areas extending to the center of the "X" from the junctions between the arms, as illustrated. The internal cavity 219 is partially filled with dielectric liquid 226. The conductive cavity 218 is parallel (i.e. equal spaced) with respect to the conductive surfaces 212, and forms four capacitors Clr, Crf, Crr, Clf, that have a capacitance value proportional to the displacement of dielectric liquid 226, as the liquid level changes with tilting of the vehicle. The lengthwise extent of the capacitors are arranged to be parallel and orientated along each separate diagonal axes of the vehicle. Since a typical vehicle is longer than it is wide, the angle 214 will generally be larger than angle 216. This arrangement enables a more direct evaluation of each diagonal axis.

Figure 3B:
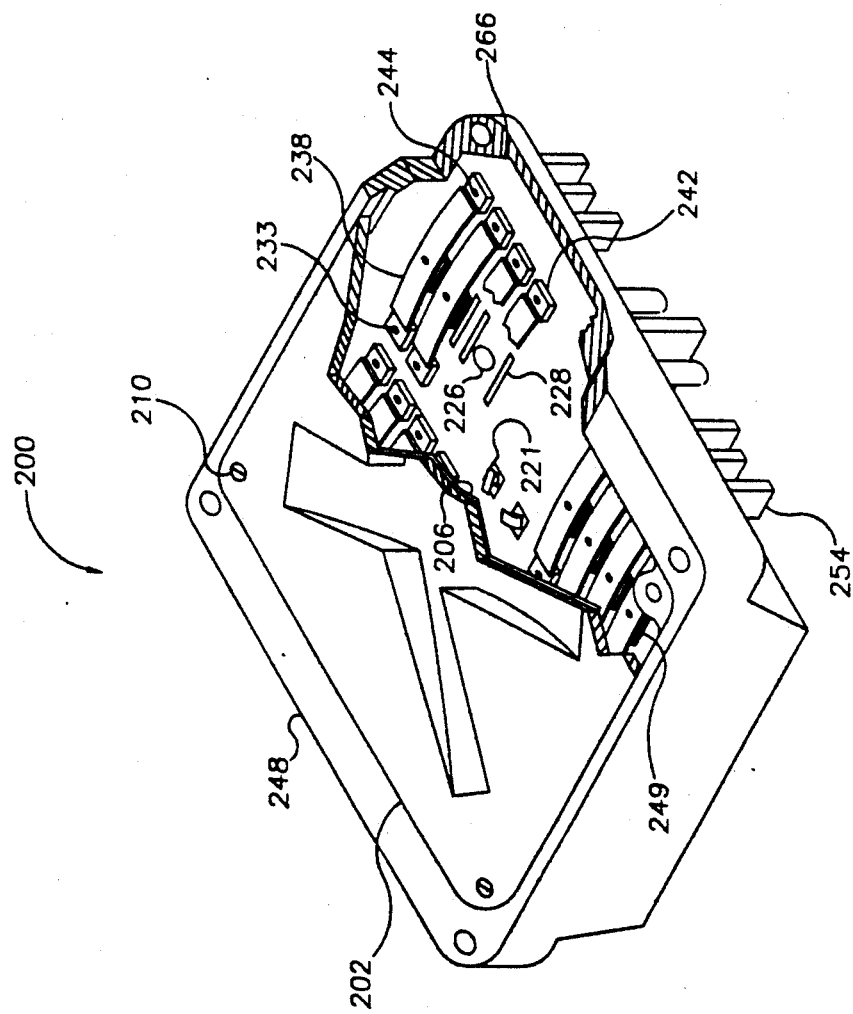
FIG. 3(b) is top perspective view the main control with portions cut away to better illustrate certain details.

I will employ the terms RR, RF, LR and LF herein to refer to the right rear, right front, left rear and left front respectively of the vehicle. FIG. 4(b) shows capacitors Clr and Crf, which correspond to the diagonal axis RF-LR of the vehicle, and as can be appreciated and due to the motion of lid 202 relative to gravity, one capacitor increases in value, as the other one decreases. When the dielectric liquid 226 covers equal areas on Clr and Crf, then these capacitors have equal value. Using the proportional change of Clr versus Crf, will accurately reflect the amount of tilt of vehicle since any changes due of temperature or voltage drifts of one capacitor will be canceled by the same changes on the other capacitor. Four springs 221, which are soldered to the printed circuit board 266 shown in FIG. 3(b) complete the electrical connections to each of the capacitors when the lid 202 is connected to ground. I will describe later how the CPU uses the proportional level sensor.

Figure 6:
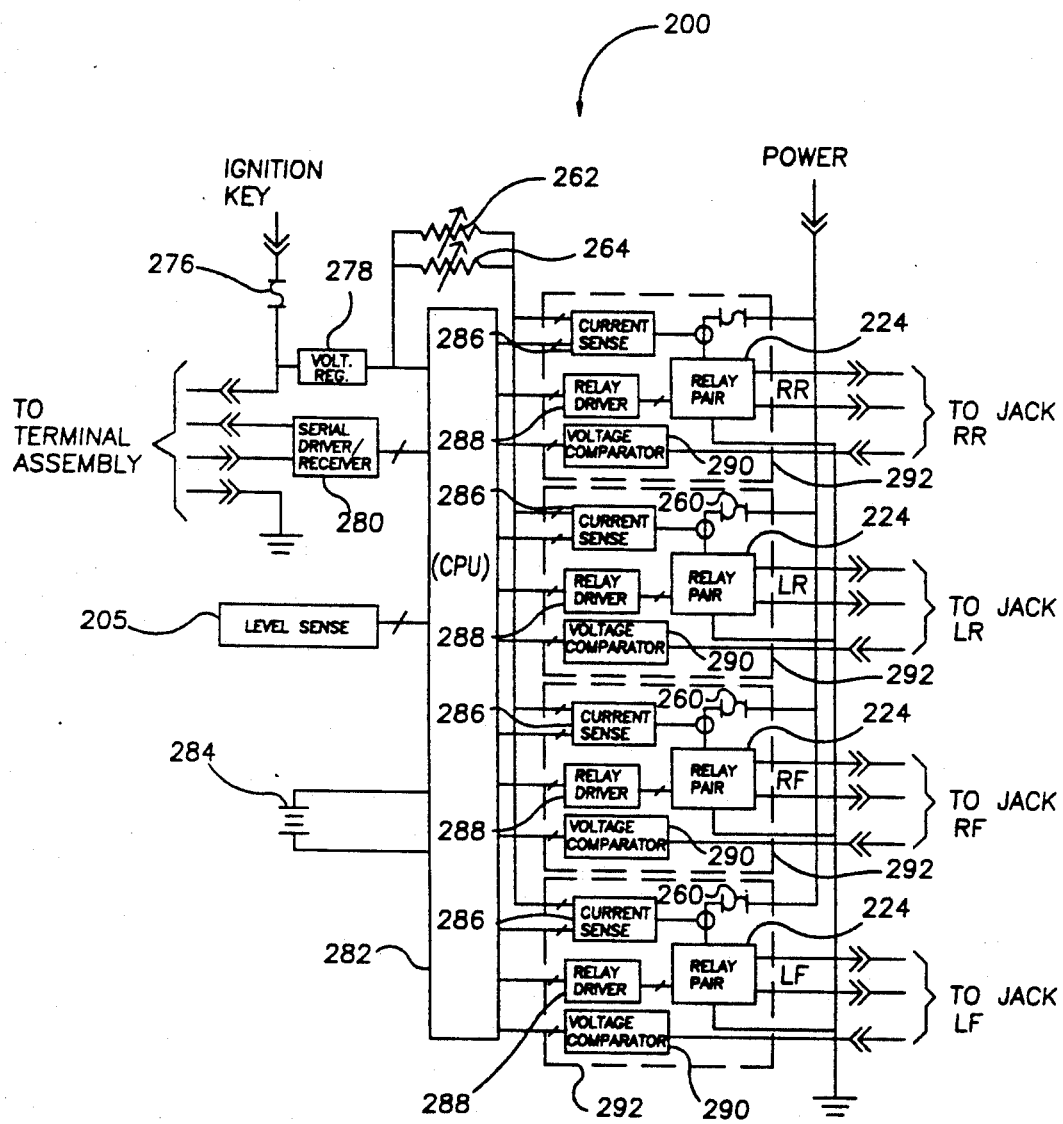
FIG. 6 is an electrical block diagram of the main control.

Printed circuit board 211 has thereon a circuit corresponding to the electrical block diagram shown on FIG. 6. This circuit includes a microcomputer 282 to which I will refer as the CPU (central processing unit), with connections to a plurality of circuits including a serial driver/receiving circuit 280, proportional level sensor 205, voltage regulator 278, battery 284 and preferably four driver control circuits 292.

Each driver control circuit 292 interfaces between the CPU 282 and a separate jack 20 and contains a plurality of circuits including a set of two double pole single throw relays 224, that can be solenoids or solid state devices. The relays 224 are separately controlled by the CPU via respective relay driver circuits 288 so that, upon activation of a relay 224 in a given pair, power is applied directly from the vehicle battery and a respective fuse 260 in each circuit 292, to the respective jack with given polarity. Consequently the respective jack 20 will be driven in one direction until said relay 224 is turned off. Likewise, upon energizing the other relay 224 in the given pair, the power will be applied to the respective jack with the opposite polarity to cause the jack 20 to run in the opposite direction. A safety circuit is built in the driver circuit 288 to prevent the simultaneous turning on of both relays 224 in a relay pair at the same time and thereby creating a short. A current sense circuit 286 that uses a Hall effect sensor, senses the intensity of the magnetic flux due to the current flowing between each fuse 260 and relay pair 224, which is in effect proportional to the current drawn by the motor on each jack 20. A voltage comparator circuit 290 interfaces the CPU to the respective position status line, and detects when the jacks are fully retracted and detects a train of pulses proportional to the speed and extension of the jacks when they are activated. The CPU continually stores each jack position as it receives the respective of pulse train, for example in up/down counters.

Two variable resistors 262, 264 are connected to all the current sense circuits. Resistor 262 enables adjustment of the maximum allowable current before the jack is deactivated, as a safety feature that acts before fuse 260 are blown. Resistor 264 enables adjustment of the low current setting that is higher than the current used before the jacks contact the ground. These resistors are connected between the output of a voltage regulator 278, and separate terminals of each of the current sensing circuits.

Printed circuit board 266 also contains a serial driver/receiver circuit 280 that interfaces the CPU 282 and the terminal control 100. Power for the CPU 282 and associated circuitry comes from the vehicle ignition key through screw terminal connector 270, via fuse 276, and voltage regulator 278. Each of the jacks is powered via a separate circuit. Wire 30 shown on FIG. 2 connects directly from the battery 32 to terminal connection 258, and has the proper gage to continuously withstand heavy amperage, e.g. 200 amps. This power is distributed via fuses 260, relays 224, to the motors on the levelers, and returns to terminal 256, where the proper gage grounding strap 31 is connected to the chassis. As a result there is a minimum resistance path for the system ground return to the battery negative terminal.

Due to the heavy currents that passes through relays 224, e.g. current surges of over 100 amps, and in order to minimize conductor resistance, the relays are built as part of the printed circuit board 266 (see FIG. 3(a-d). The relay is comprised of an outer flux collector 228, which is made of a flat bar magnetic steel and bent in a "U" shape with a center flux collector 226 attached to the outer flux collector 228, which is made of a round magnetic bar. A magnetic wire 246 is wound over the member 226 and electrically connected to relay driver 288. A spring bar 238, preferably made of beryllium copper and formed with a slight curve, is supported with screw 233, nut 230 and spacer 232 on the printed circuit board 266. The spring bar 238 supports a hammer 249 via rivet 234 and spacer 236. It also supports a contact 240 which is preferably made of a strong and highly conductive material, such as silver tungsten alloy, and is aligned with contact 24 which is supported with screw 244 in the printed circuit board 266 and is preferably made of a highly conductive but relatively softer material such as carbon graphite with heavy copper content. The use of these different contact materials avoids the 'sticking' or welding of the contacts under heavy amperage. When a relay is activated, a magnetic field is created around the magnet wire 246 and associated flux collectors 226 and 228 and will cause hammer 249 and spring bar 238 to move and consequently cause the contact 240 to engage the contact 242, thereby closing the electrical circuit. For every activation of relay 224, the spring 238 goes from a curve to a straight shape, as shown in FIG. 3(d), producing a brushing action between contacts 240 and 242. This brushing action produces a self cleaning effect on the contacts and, even though there will be wear on the softer contact 242, it will have a calculated trouble free life inasmuch as a carbon brush has a limited life in an electric motor. Screws 233 and 244 allow contacts 240 and 242 to be serviced without discarding the rest of relay 224.

Figure 5A:
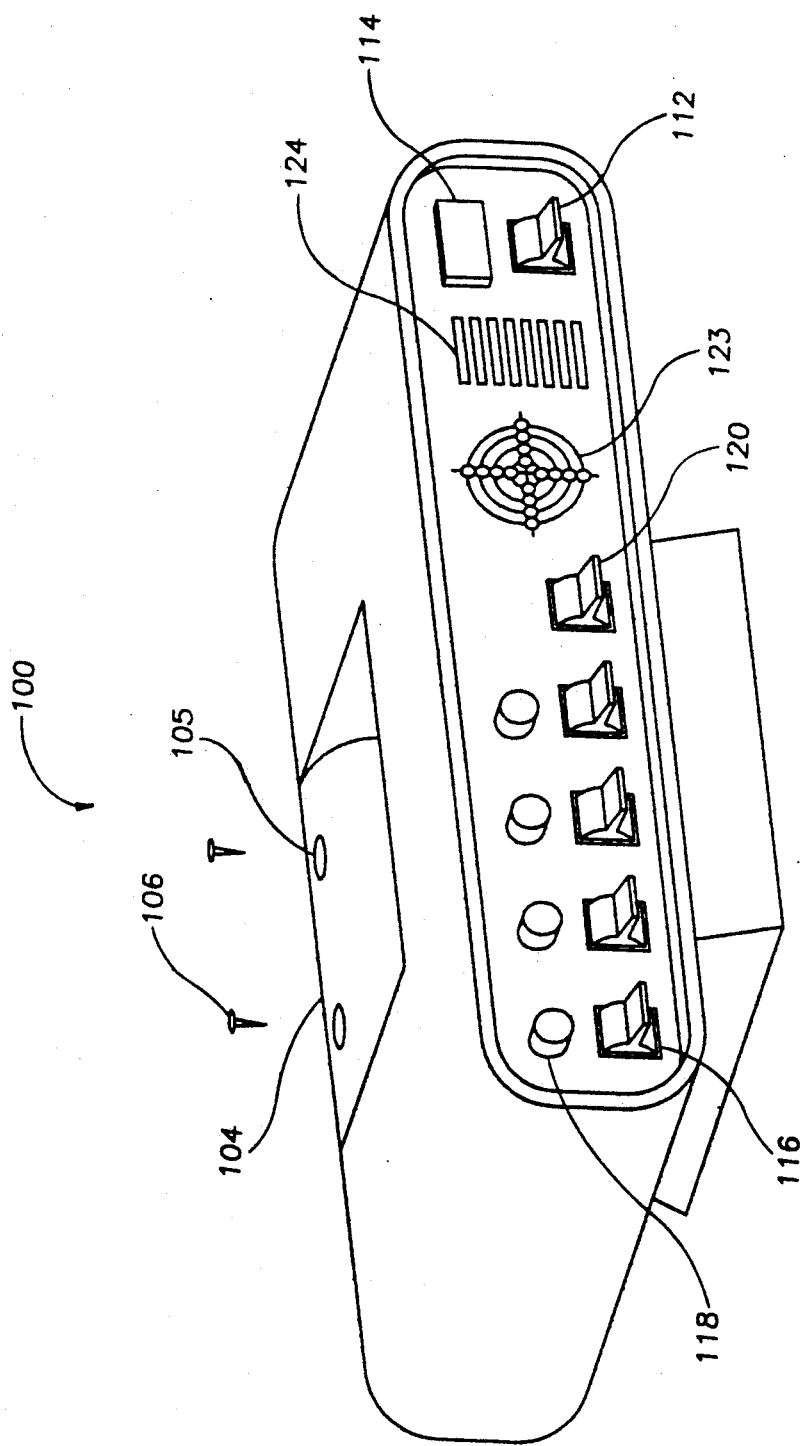
FIG. 5(a) is a perspective view of a terminal control.
Figure 5B:
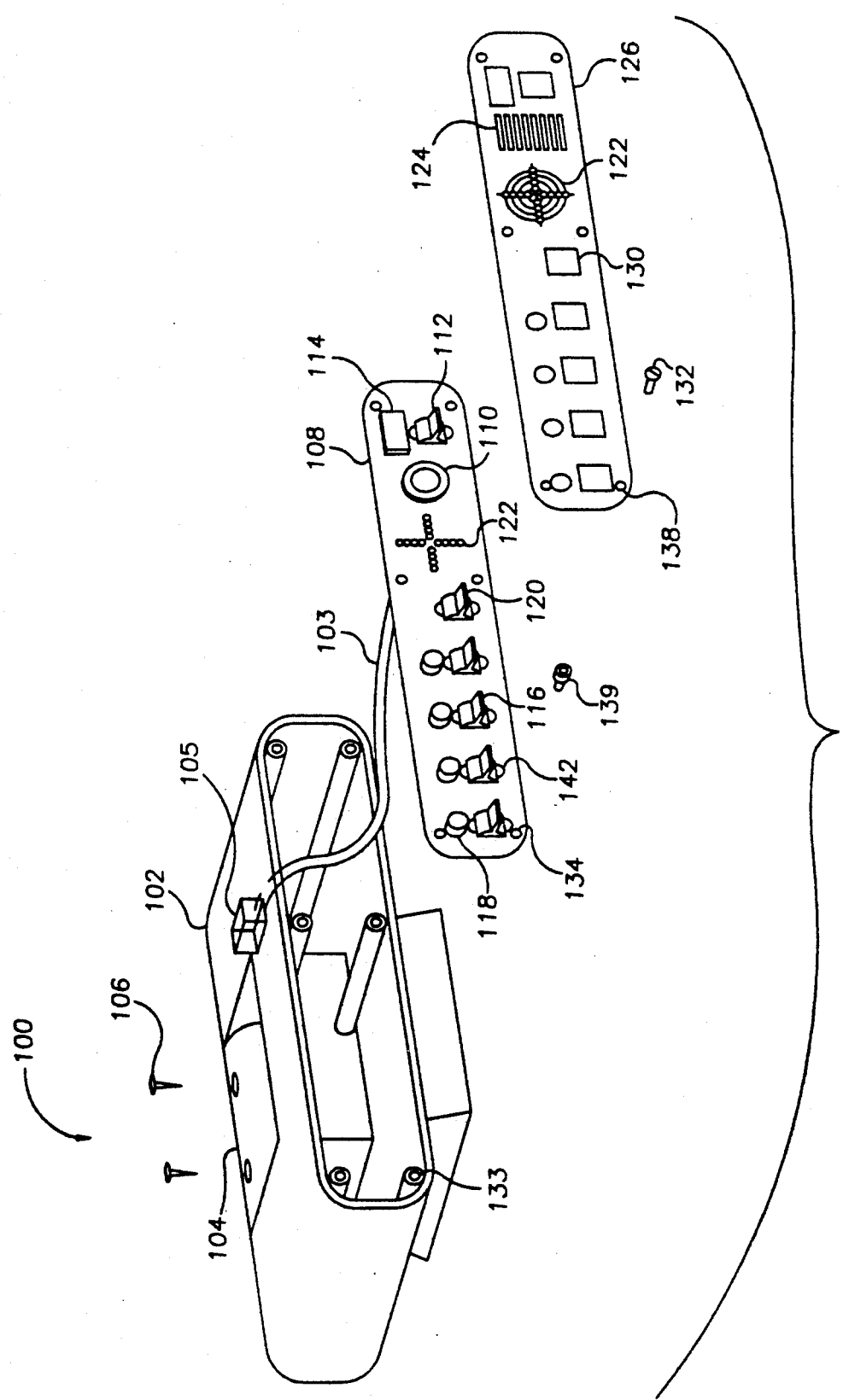
FIG. 5(b) is an exploded view of FIG. 5(a) to better illustrate details of its construction.

With reference to FIGS. 5(a) and (b), the terminal control 100 is comprised of a base 104 for mounting in or on the vehicle using two screws 106 via mounting holes 105. The base 104 supports a rotatable enclosure 102 mounted at the ends of the base 104 with mounting screws 148 and locking nuts 146. Screw 148 also holds washers 150, spacer 142, and with spring washer 150 forms a adjustable clutch for controlling the pivotal force needed to move the rotatable enclosure 102 around the base 104, with a total of 180 degrees of permitted rotation. This makes the installation of the terminal control quite simple and faster, allowing the assembly to be orientated in any direction in or on the vehicle and mounted without having to separate the assemblies during installation as it was done with prior devices.

The rotatable enclosure 102, preferably made of molded plastic, encloses the printed circuit board 108 which is supported with screw spacers 139 via holes 134 and into holes 133 of the enclosure. The cover 126 which is preferably made of injection molded plastic, is also supported by the rotatable enclosure 102 with screws 132, via screw spacers 139.

The printed circuit board 108 receives its power and signal lines through wire harness 28 when modular plug 223, which is attached to harness 28, mates with receptacle 105 supported in the back of the rotatable enclosure 102. Wire harness 103 connects receptacle 105 to the printed circuit board 108. The modular connectors allow the terminal control 100 to be easily installed and serviced.

Figure 7:
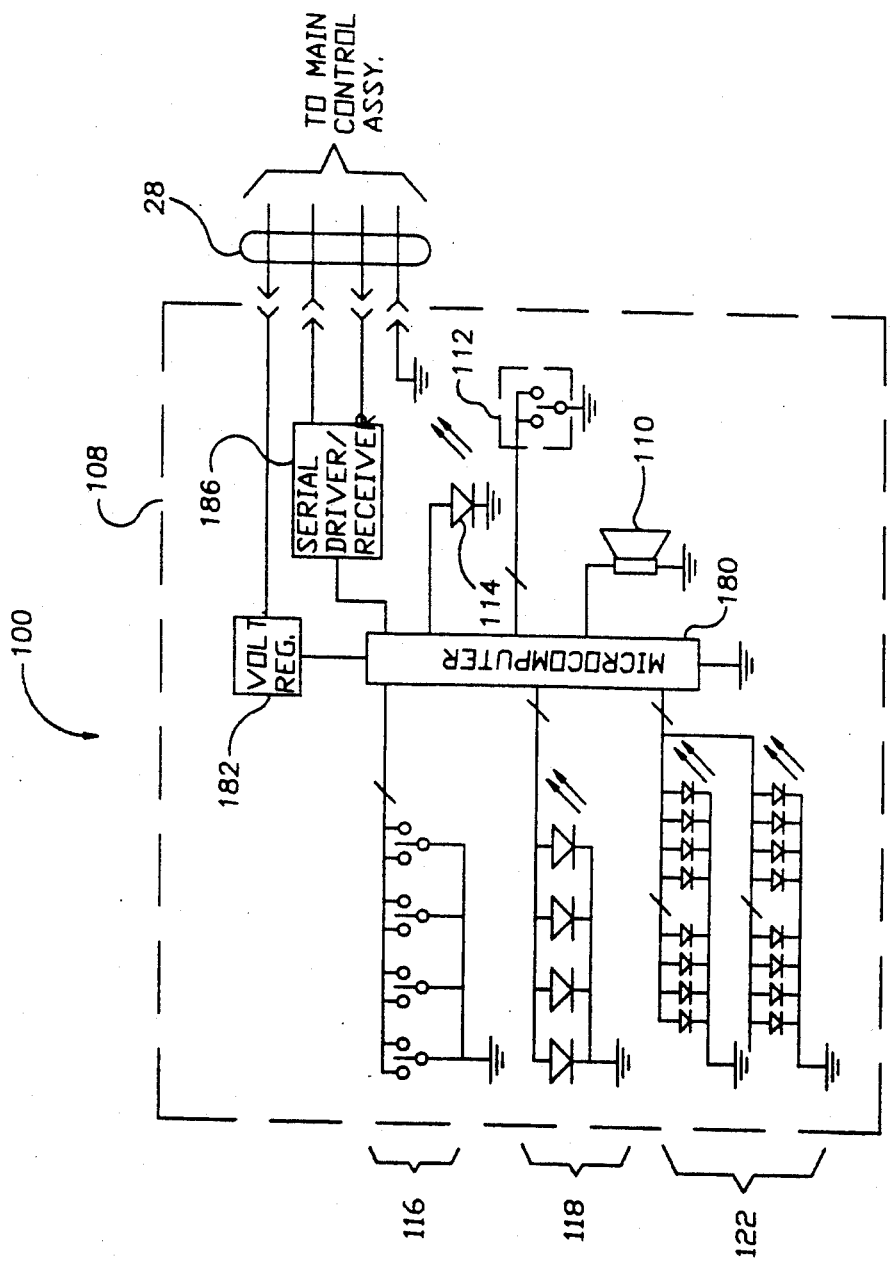
FIG. 7 is an electrical block diagram of the terminal control.

The printed circuit board 108 contains the microcomputer 180 shown on FIG. 7, and includes means to control the interface of the user with the leveling system. The microprocessor 180 connects to a plurality of input and output elements for the interface of the user with the leveling system. The inputs are comprised of an array of momentary switches distributed as follows: four switches 116 for the manual retraction and extension of each leveler, one switch 120 for automatic leveling and retract of all levelers, and one switch 112 for signaling power on/off. For economical reasons, each switch is designed as part of the printed circuit board 108 (see FIG. 5(c) and (d)). Each switch comprises a handle 113 which has two rounded protrusions 115 at its base, and used as alignment guides that are inserted into matching holes 144 on the printed circuit board 108. Handle 113 is supported on printed circuit board 108 with a screw 119 with an elastic washer 117 which exerts a predetermined pressure on the handle 113 but allows limited rotational motion of the handle. Actual switching contact occurs when the extended arms 111 of the handle 113 press against metallic domes 142 which are mounted directly over conductive traces on the printed circuit board 108 and under each extended arm 111, to cause the metallic dome to buckle and produce a tactile feel and contacting a conductor trace under said metallic dome 142.

In normal use the remote control switches face the user and the handle motion will follow the analogy of the intended function; that is, depressing switches "down" will cause the levelers to extend (go down), either on automatic or manual mode; likewise raising the switches "up" will cause the levelers to retract (go up).

Among the outputs are a piezo ceramic buzzer 110, which sounds a warning signal for a determined length of time if the ignition key is turned on and all of the jacks are not fully retracted. This is an important warning to avoid driving the vehicle off with the jacks extended. Also the buzzer 110 sounds similar to a heart beat signal as long as a manual or automatic function are active. The buzzer will also sound when trying to retract the jacks when they are already retracted, either on manual or automatic and as long as the switch is depressed. Other outputs include a double array of level display lights 122, a power light 114, and a array of four warning lights 118 which are on when levelers are not fully retracted and are located next to corresponding manual switches 116, placed above the switches to avoid blocking the user's view with a finger while switch is being depressed.

The double array of level display lights 122 are placed at 90 degrees one from the other to simulate a target shape with four vectors, with each vector representing a particular corner of the vehicle. This array of lights is turned on in proportion to the degree of tilt of the vehicle relative to gravity. If the vehicle is level, all vector lights will be fully on. If a corner or side of vehicle is lower (which makes the opposite side higher), then the corresponding low side vector(s) will have its lights off starting from the center of the level display. The number of lights that are off is proportional to the degree of error of that particular corner(s), and if all lights are out on said vector(s), it means that there is not a sufficient leveler extension stroke to bring that corner(s) of vehicle to a level position. This informs the driver to move the vehicle to a more level ground before attempting leveling of vehicle.

The main controller CPU has procedures for permanently saving a plurality of variables, including proportional level sensor values present when the vehicle is level, the maximum proportional sensor values that will allow a successful leveling operation, and the full extension of the jack responsive to the counting the incoming train of pulses via the jack status line. In accordance with the invention, the procedure to save these variables, is to first level the vehicle using conventional leveling tools and by activating the jacks through the manual switches on the terminal control. After the vehicle is level, the CPU must be told to save the present value readings on the proportional level sensor. This is done by entering a particular code, e.g. by depressing several manual switches at the same time, for example, the front jacks switches extended and the rear jack switches retracted. The CPU recognizes a multiple manual request and will not operate the jacks. Instead it will look at the code and try to match to the CPU preset values and to act upon a particular code entry. In this example the CPU will recognize the operator's request to save the proportional sensor values as the level values. Now, with the vehicle parked on a level ground and all the jacks retracted, the operator will extend to the maximum allowed one jacks at a time, save the corresponding proportional level sensor value, and retract the jack, e.g. the RR corner, then the RR jack will be extended fully. Now as done on the previous example, the operator will enter the corresponding code to save the maximum proportional sensor values, and the maximum jack extension. This procedure is repeated once for each corner of vehicle. These values will be used for reference when leveling the vehicle.

After an automatic leveling request, the CPU has a procedure to check first if there is enough extension stroke on the jacks under the low side of the vehicle. This is done by evaluating the present sensor values with respect to the saved maximum sensor values. If the present sensor values are larger, then the buzzer signals an error, indicating to the operator that leveling can not be done from the present vehicle tilt with respect to gravity.

Otherwise the CPU will activate all of the jacks at the same time and at different speeds. Assuming that the level value saved are when $Clr = Crf$, and likewise when $Crr = Clf$ for each diagonal axis. Any other values will work as they are internally offset to balance the equation. The CPU will evaluate each diagonal axis; thus for diagonal LR-RF, If $Clr > Crf$, and according to the arrangement shown on FIG. 3(a), will determine that the LR is lower than the RF of the vehicle, and will save the proportion $Clr/Crf$ as the amount of tilt due to gravity for the LR-RF diagonal axis. The same evaluation is done for the RR-LF diagonal axis, and if $Crr > Clf$ then the RR corner is lower for the LF corner, and with the amount of tilt will be saved as $Crr/Clf$. If $(Crr/Clf) > (Clr/Crf)$ then the CPU will know that the rear is the lower side of the vehicle, with the right rear at its lowest corner, followed by the left rear, and then the right front.

The CPU will now adjust the speed of the jacks accordingly, with a higher speeds on the diagonal axis with the lowest side. In the preceding example, the lowest axis is the RR-LF axis with the RR as the lower side, then the maximum speed will be on the RR jack which is under the lowest corner of the rear of vehicle and with a lesser speed on the LR which is under the next to the lowest corner. The speed of the LR jack will be proportional to $(Crr/Clf) - (Clr/Crf)$ value, with a minimum speed at a certain value, and a maximum speed if the result is equal to zero. The speeds on the RF and RR jacks, which are under high side of the diagonals axis will have a speed proportional to their diagonal proportional sensor values. If the sensor approaches level values then the jacks will have maximum speed. If the sensor values approach the maximum proportional saved values, then corresponding jacks will have minimum speed.

During the jack extension process, the CPU has a procedure to constantly check the amount of current used by each jack. When all of the jacks are using higher than the low current setting 295, and $Clr/Crf = 0$, and $Crr/Clf = 0$, that is both axis are level, then all the jacks are deactivated.

The preceding logic is repeated at high speeds, constantly adjusting the extension speed of the jacks to smoothly and quickly bring the vehicle to a level position.

Figure 8:
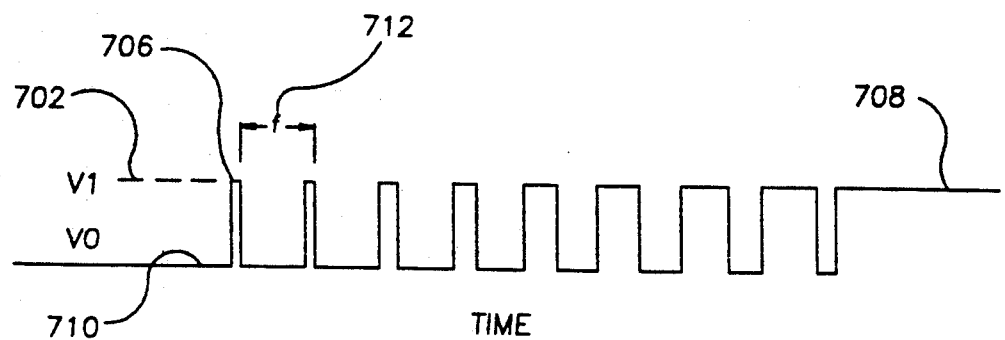
FIG. 8 shows a square wave as produced by the CPU of the main controller.

The actual speeds of the jacks are changed by procedures on the CPU to control pulse width modulation outputs which are applied to each relay driver. An example of one of the square wave outputs signals is shown on FIG. 8. The square wave shows low 710 when the jack is inactive. Upon activation, the square wave is switched high 702 at a determined frequency 712. The time that the square wave remains high will be the time that the relay is turned on and will determine the speed of the jack. The minimum speed time is shown by 706, and a maximum speed time is shown by 708, where the turn on time is the same as the frequency time. All intermediate variations are proportional to the equations described above during the automatic leveling process.

If mechanical relays are used, the frequency in the described example of the invention will be relatively slow to allow sufficient time to open and close the relay contacts. Accordingly, it is more desirable to use solid state relays, although solid state relays that handle sufficiently heavy current, as required in this use, are currently expensive.

Due to the different loads that each jack may be subject to and that will affect the speed during the leveling operation, the CPU has a procedure to evaluate the frequency of the incoming pulses via the jack status lines 38 connected to voltage comparator 290, and to further adjust the corresponding speed of each jack.

The CPU has a procedure to permanently maintain up/down counters for each jack. These counters receive the incoming pulses from the jack status line and their count always reflects the jack position. During the manual or automatic operations, the CPU automatically stops the jack from extending beyond its limits.

In an alternate logic to level the vehicle, all the jacks are extended simultaneously at maximum speed until each jack stops, independently of the other jacks, when it senses a minimum amperage. The maximum amperage indicates that the jack is contacting the ground. The CPU will then read the proportional level sensor values to determine the exact amount of extension required for each jack to level the vehicle, and then proceed to drive the jacks at maximum speed for the calculated extensions. If the vehicle is not yet level, the CPU will repeat the operation until vehicle is level, also making sure that the minimum amperage is sensed at all of the jacks. In the event that any of the jacks has yet to reach its extension limit and the vehicle is not yet level, the CPU, using a reverse logic, retracts the other jacks in an attempt to level the vehicle. This retraction sequence is repeated as long as vehicle is not level and all the jacks are sensing the minimum amperage.

As can be appreciated, this alternate logic does not use variable speeds and is accordingly much less demanding on the relay construction and wear.

In accordance with a third alternate logic to level the vehicle, the jack under the lower diagonal axis is extended at maximum speed. When this axis reaches to the same level as the low side of the other axis, then the jack under the other axis will also start extending simultaneously with the first jack. If, however, the low side of both axis were initially at the same level, then both jacks will start simultaneously. The CPU has a procedure to constantly evaluate the attitude of both axes and apply the preceding logic. At times and due to shifts in vehicle weight that will offset the attitude of the vehicle, different jack will be energized during the leveling process. Upon both axes reaching a level position, then the non active jack will also extend. With all of the jacks now running, the CPU will simultaneously check for the minimum current on each jack, and will deactivate them when they use the minimum current. The CPU gives a final adjustment on the diagonal axes if they have shifted off level during the minimum current process.

As can be appreciated, this third alternate logic also does not use variable speeds, and it does not require the train of pulses from the jacks to know the exact jack position.

The above described leveling logics can also be combined to resolve the leveling process of a vehicle.

After an automatic retraction request, the CPU has a procedure to retract all the jacks simultaneously and at maximum speed. During this operation the CPU, reads the jack status lines, and stops the jacks when the corresponding jack status line voltage goes to ground, or their corresponding position counters have reached zero.

While the invention has been disclosed and described with reference to a limited number of embodiments, it will be apparent that variations and modification may be made therein, and it is therefore intended in the following claims to cover each such variation and modification as falls within the true spirit and scope of the invention.

What is claimed is:

1. In an apparatus for leveling a vehicle, including a plurality of jacks mounted at different locations to the vehicle, and control means for selectively controlling said jacks to extend and contract, the improvement wherein said control means comprises a level sensor for providing output signals corresponding to the degree of tilt of separate axes extending between said jacks, and means responsive to separate ones of said output signals for energizing separate said jacks to extend or contract independently of one another, where a plurality of said jacks may be energized simultaneously, thereby increasing the speed of leveling of said vehicle.

2. The apparatus of claim 1, wherein said means for energizing said jacks comprises means responsive to said output signals for simultaneously energizing the jacks adjacent the two lowest corners of said vehicle.

3. The apparatus of claim 1 wherein said control means comprises means for expanding said jacks at a constant rate.

4. The apparatus of claim 1 wherein said control means comprises means for stopping expansion of each said jack in response to the sensing of a respective level at the corresponding axis by said sensor.

5. The apparatus of claim 1 further comprising an indicator responsive to the output of said sensor for indicating the tilt of the vehicle along each of said axes.

6. The apparatus of claim 1 wherein said sensor is mounted to the bottom of said vehicle at a central position thereof and separately removably connected to each of said jacks.

7. In an apparatus for leveling a vehicle, including a plurality of jacks mounted at different locations to the vehicle, and control means for selectively controlling said jacks to extend and contract, the improvement wherein said control means comprises a level sensor for providing output signals corresponding to the degree of tilt of axes extending between said jacks, and means for simultaneously energizing at least two of said jacks to extend or contract, thereby increasing the speed of leveling of said vehicle, each of said jacks including means for producing a first signal when the respective jack is in its uppermost position, and means for producing a pulse train of pulses at a rate corresponding to the rate of extension of the respective jack, said control means comprising means responsive to said first signal for stopping the respective jack and means responsive to said pulse train for monitoring the speed of expansion of said jack.

8. In an apparatus for leveling a vehicle, including a plurality of jacks mounted at different locations to the vehicle, and control means for selectively controlling said jacks to extend and contract, the improvement wherein said control means comprises a level sensor for providing output signals corresponding to the degree of tilt of axes extending between said jacks, and means for simultaneously energizing at least two of said jacks to extend or contract, thereby increasing the speed of leveling of said vehicle, said means for simultaneously energizing said jacks comprising means for energizing said jacks to expand at a rate proportional to the tilt along the respective axes.

9. In an apparatus for leveling a vehicle, including a plurality of jacks mounted at different locations to the vehicle, and control means for selectively controlling said jacks to extend and contract, the improvement wherein said control means comprises a level sensor for providing output signals corresponding to the degree of tilt of axes extending between said jacks, and means for simultaneously energizing at least two of said jacks to extend or contract, thereby increasing the speed of leveling of said vehicle, said means for simultaneously energizing said jacks comprising means for energizing only the jack at the lowest corner of said vehicle until it attains the level of the next lowest corner, and then simultaneously energizing the jacks that were initially at the lowest and next lowest corners.

10. In an apparatus for leveling a vehicle, including a plurality of jacks mounted at different locations to the vehicle, and control means for selectively controlling said jacks to extend and contract, the improvement wherein said control means comprises a level sensor for providing output signals corresponding to the degree of tilt of axes extending between said jacks, and means for simultaneously energizing at least two of said jacks to extend or contract, thereby increasing the speed of leveling of said vehicle, said level sensor comprising a cavity having changers with curved bottom sections extending parallel to said axes, capacitor plates on opposition sides of said chambers, and a dielectric liquid partially filling said cavity.

11. A method for leveling a vehicle by a plurality of jacks, wherein each jack is adjacent a respective corner of said vehicle, comprising sensing the degree of tilt of the vehicle along a plurality of axes parallel to lines that extend through the axis of at least one of said jacks, with separate sensors, and simultaneously independently expanding at least two of said jacks in response to outputs of separate said sensors that correspond to the lowest corners of the vehicle.

12. The method of claim 11 wherein said step of expanding said jacks comprises expanding said jacks at a constant rate.

13. A method for leveling a vehicle with four jacks located in the vicinity of separate corners of the vehicle, comprising sensing the tilt of the vehicle along a pair of diagonals parallel to lines extending through diagonally opposite jacks, with separate sensors, then simultaneously independently expanding the two jacks corresponding to the lowest corners of said vehicle in response to the outputs of separate said sensors.

14. The method of claim 13 wherein said step of expanding said two jacks comprises initially expanding only the jack corresponding to the lowest corner of said vehicle, and then simultaneously energizing said two jacks when the corner of the vehicle that was initially the lowest corner reaches the level of the next lowest corner.

15. The method of claim 13 wherein said step of expanding said jacks comprises expanding said jacks at a rate proportional to the tilt along the respective axis.

16. A method for leveling a vehicle by a plurality of jacks, wherein each jack is adjacent a respective corner of said vehicle, comprising sensing the tilt of the vehicle along a plurality of axes, parallel to lines that extend through the axis of at least one of said jacks, and simultaneously expanding at least two of said jacks that correspond to the lowest corners of the vehicle, said step of expanding comprising expanding said jacks at a rate proportional to the tilt of the respective axis.

17. In an apparatus for leveling a vehicle including four jacks arranged to raise separate corners of the vehicle, the improvement comprising a tilt sensor mounted to said vehicle for sensing the degree of tilt of the vehicle along a pair of axes parallel to lines passing through the axes of diagonally opposite jacks, and control means responsive to the outputs of the sensors for simultaneously independently expanding at least the two jacks at the lowest corners of the vehicle in response to the outputs of separate sensors.

18. The apparatus of claim 17 wherein said control means comprises processing means mounted to the bottom of the vehicle adjacent said sensor and separately connected to said jacks, and a control unit mounted within said vehicle for control by a user.

19. The apparatus of claim 17 wherein said control means comprises means for controlling said jacks to expand at a substantially constant rate.

20. In an apparatus for leveling a vehicle including four jacks arranged to raise separate corners of the vehicle, the improvement comprising a tilt sensor mounted to said vehicle for sensing the tilt of the vehicle along a pair of axes parallel to lines passing through the axes of diagonally opposite jacks, and control means responsive to the output of the sensor for simultaneously expanding at least the two jacks at the lowest corners of the vehicle, said control means comprising means for controlling said jacks to expand at a rate responsive to the output of said sensor.

21. An apparatus for leveling a vehicle having a body, four wheels for supporting said body and four jacks positioned in the vicinity of separate corners of said body, for raising and lowering said body, said apparatus comprising a main control unit mounted to the underside of said body and including a level sensor positioned at the junction of a pair of diagonal lines extending through said jacks, and a terminal control unit mounted within said vehicle, said main control unit having a separate releasable connecting means directed toward each of said jacks, and a separate modular connector and conductor connecting each connecting means to the switch of the respective jack, said modular connectors being connectable to the different connecting means in different directions to thereby minimize the possibility of connecting a modular connector to the wrong connecting means.

22. An apparatus for leveling a vehicle having a body, four wheels for supporting said body and four jacks positioned in the vicinity of separate corners of said body, for raising and lowering said body, said apparatus comprising a main control unit mounted to the underside of said body and including a level sensor positioned at the junction of a pair of diagonal lines extending through said jacks, said level sensor comprising a member with a cross shaped cavity, the arms of which are aligned with said diagonal lines, each arm of said sensor defining a separate capacitor, and a dielectric liquid partially filling said cavity.

* * * * *